(12) United States Patent
Sung

(10) Patent No.: US 6,811,278 B2
(45) Date of Patent: Nov. 2, 2004

(54) ELECTROLUMINESCENT CLOCK

(76) Inventor: Yuan-Chi Sung, 3rd Fl., No. 5, Lane 337, Yungho Rd., Chungho City, Taipei Hsien (TW)

(*) Notice: Subject to any disclaimer, the term of this patent is extended or adjusted under 35 U.S.C. 154(b) by 0 days.

(21) Appl. No.: 10/678,235

(22) Filed: Oct. 3, 2003

(65) Prior Publication Data

US 2004/0125585 A1 Jul. 1, 2004

(30) Foreign Application Priority Data

Dec. 30, 2002 (TW) ........................ 91221464 U

(51) Int. Cl.[7] ............................................. F21V 33/00
(52) U.S. Cl. .......................... 362/84; 362/23; 362/29; 362/253; 368/67; 368/83
(58) Field of Search ............................ 362/84, 253, 23, 362/29, 800; 368/10, 67, 82, 83, 62, 46

(56) References Cited

U.S. PATENT DOCUMENTS 3,273,331 A * 9/1966 Mosovsky .................. 368/226
5,838,644 A * 11/1998 Yoneda et al. ............... 368/232
5,926,440 A * 7/1999 Chien ........................... 368/10
6,158,868 A * 12/2000 Chien ........................... 362/84
6,487,143 B1 * 11/2002 Kaelin ........................ 368/227

FOREIGN PATENT DOCUMENTS

JP       02177290 A  * 7/1990  ........... H05B/33/00
JP       11174164 A  * 7/1999  ........... G04B/19/30

* cited by examiner

Primary Examiner—Thomas M. Sember
(74) Attorney, Agent, or Firm—Jackson Walker LLP

(57) ABSTRACT

An electroluminescent clock is disclosed, wherein light emitting dots are installed on the back side of a transparent plate and ring around and beneath luminous markers, whereby when the light emitting dots are enabled, the luminous markers can be presented with uniform lighting to allow a user to see the clock time in the darkness and even from a distance. The night light feature is further enhanced by a special design that creates a soft visual effect on the dial of the clock for easy recognition of clock time.

14 Claims, 4 Drawing Sheets

ELECTROLUMINESCENT CLOCK

BACKGROUND OF THE INVENTION

1. Field of the Invention

The present invention relates to an electroluminescent clock, particularly to a clock that that is capable of lighting up the luminous markers at night time or in the darkness.

2. Description of Related Arts

In general, clocks with a night light capability are able to show the clock time by illuminating the figures and the pointers automatically at night or in the darkness with no need of flashlights or other light sources to supplement the existing lighting. These night light clocks often employ a layer of fluorescent coating over the figures or the scale for indicating the time at night. After the fluorescent material has absorbed sufficient light energy from the external environment, the fluorescent coated figures on the dial of the night light clock begin to give out light. However the intensity of the light is not able to make the clock time instantly recognizable from a distance, and the light tends to fade after extended use. Furthermore, the fluorescent material itself will disintegrate over time and fall off in flakes from the dial surface, thus this is not an ideal light source for permanent illumination.

Another illumination technique is by hiding one or more small light bulbs behind the corners and around the rim of the dial in close proximity to the figures or the scale. This method is able to provide sufficient lighting for showing the time at night or in the darkness, but the illumination is often biased as the light intensity cannot be uniformly distributed over the figures and the dial surface. Therefore, user still has to get close to the clock to see the time clearly.

Thus neither the light bulbs nor the fluorescent coating are ideal as a reliable light source for telling the time at night.

SUMMARY OF THE INVENTION

The primary objective of the present invention is to provide an electroluminescent clock that causes the luminous markers on the dial of the clock to give out uniform illumination at night or in the darkness, whereby a user is able to see the clock time clearly regardless of external lighting conditions.

The secondary objective of the present invention is to provide an electroluminescent clock with a soft visual effect for easy recognition of the time.

To this end, there is provided an electroluminescent clock comprising, a lower portion of an external case, a main bracket being disposed over the lower portion of the external case, multiple light emitting dots, a transparent plate, a dial having a pointer at the center, a transparent ring, and an upper portion of the external case.

The transparent plate is formed with light transmissive material and attached with several luminous markers positioned at predetermined locations over the surface. Multiple holes are defined in the lower side for accommodating the light emitting dots, and the holes correspond to the positions of luminous markers on the upper side.

The transparent ring is also formed with light transmissive material with multiple holes defined in the lower side for accommodating the light emitting dots.

The dial is formed from opaque material having multiple slots defined in the surface for accommodating the luminous markers.

The electroluminescent clock is characterized in that the holes are defined in the back side of the transparent plate close to the locations of the luminous markers, next to the lower portion of the external case.

The electroluminescent clock is also characterized in that the luminous markers are aligned with the corresponding slots in the dial, and that the luminous markers can be either augmented from the surface of the dial or embedded in the dial.

The electroluminescent clock is also characterized in that the luminous markers enclosed by the transparent plate and the transparent ring are presented through the slots of the dial with proper illumination.

The electroluminescent clock is also characterized in that the luminous markers can be in the form of figures, scale or graphical patterns.

The electroluminescent clock is also characterized in that the back side of the transparent plate next to the inner wall of the lower portion of the external case is coated with the fluorescent material as a reflective layer.

The electroluminescent clock is also characterized in that the upper side of the transparent ring is formed around the rim of the dial, having the upper side shaped like a hump, and the lower surface formed with grid-like grooves.

The electroluminescent clock is also characterized in that the light emitting dots are light emitting diodes (LEDs).

The present invention can provide illumination with uniform brightness and sustained light emission, whereby a user can clearly recognize the clock time in the darkness or at night time and even from a distant location.

The features and structure of the present invention will be more clearly understood when taken in conjunction with the accompanying figures

DETAILED DESCRIPTION OF THE PREFERRED EMBODIMENT

Figure 1:
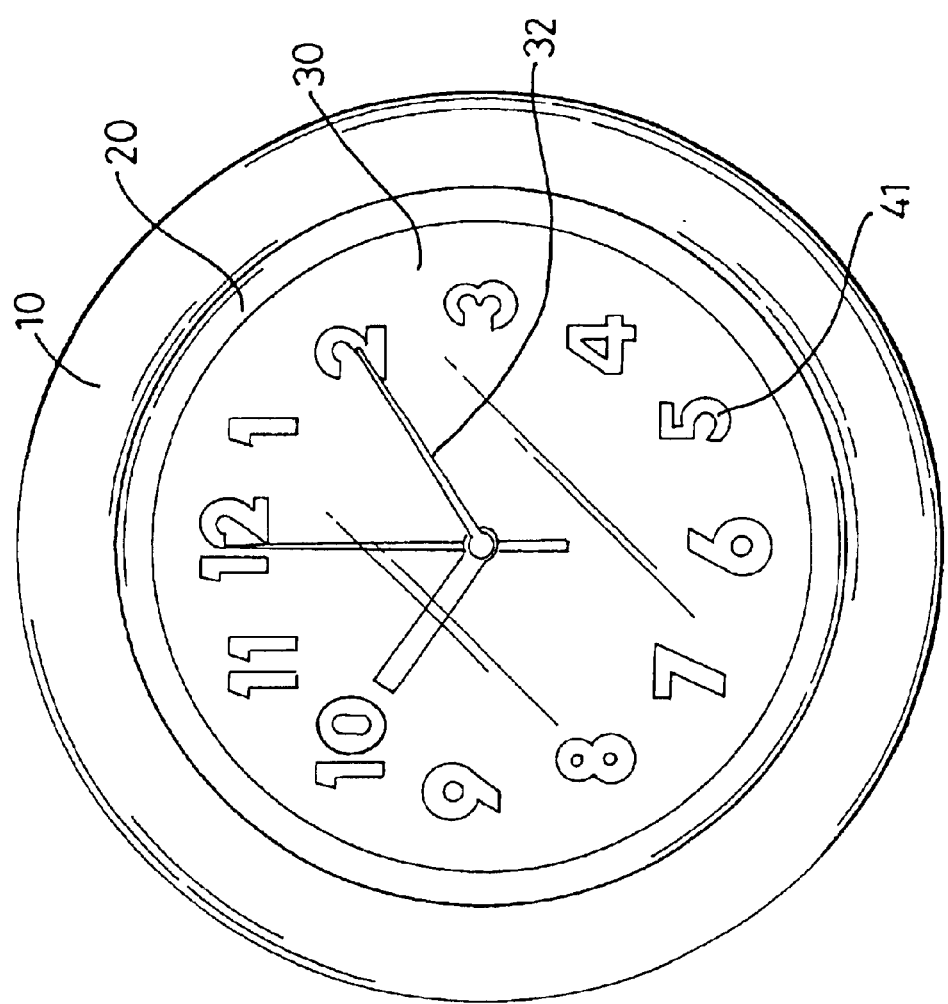
FIG. 1 is a front view of the present invention.
Figure 2:
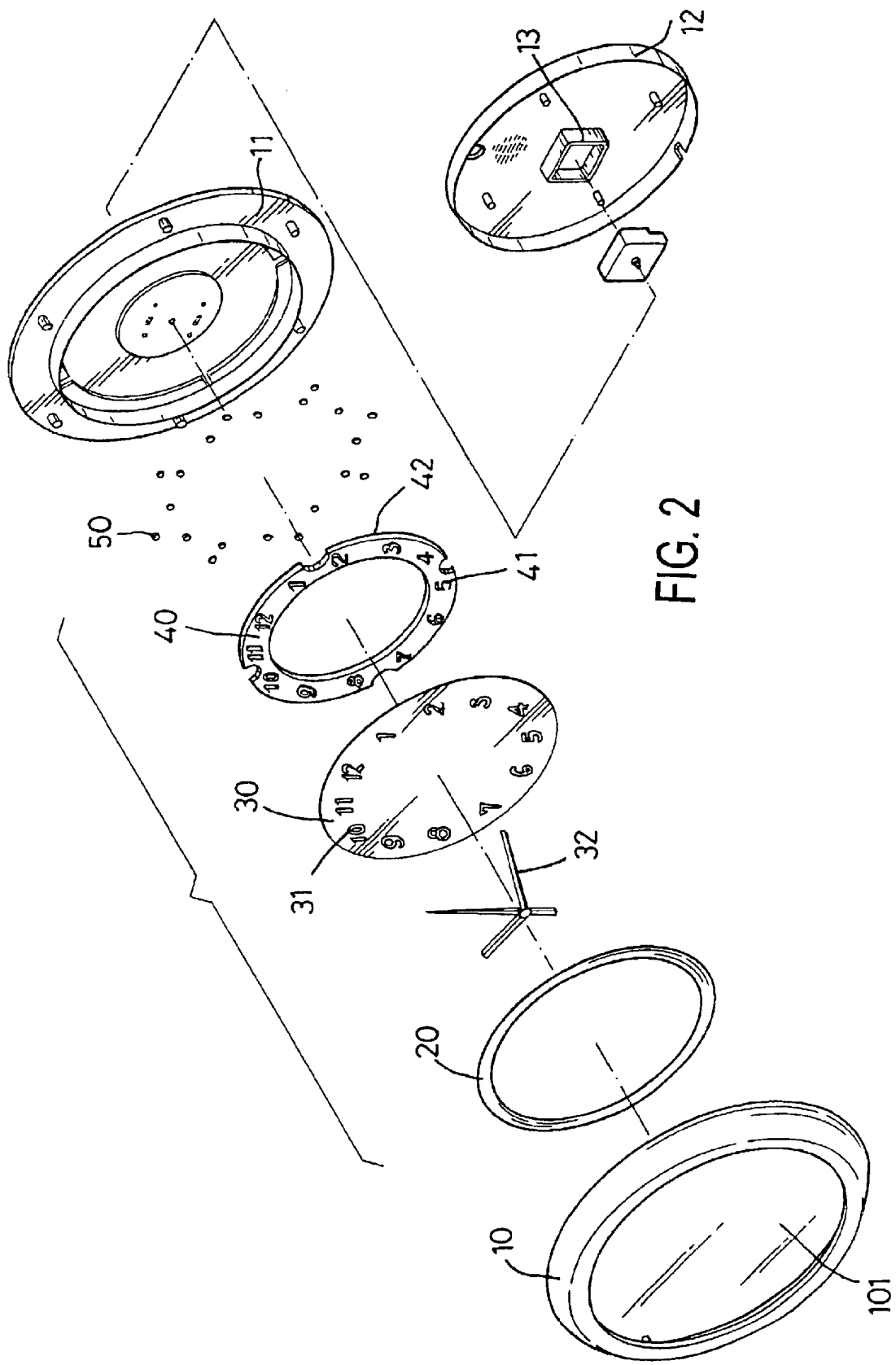
FIG. 2 is an exploded view of the electroluminescent clock.
Figure 3:
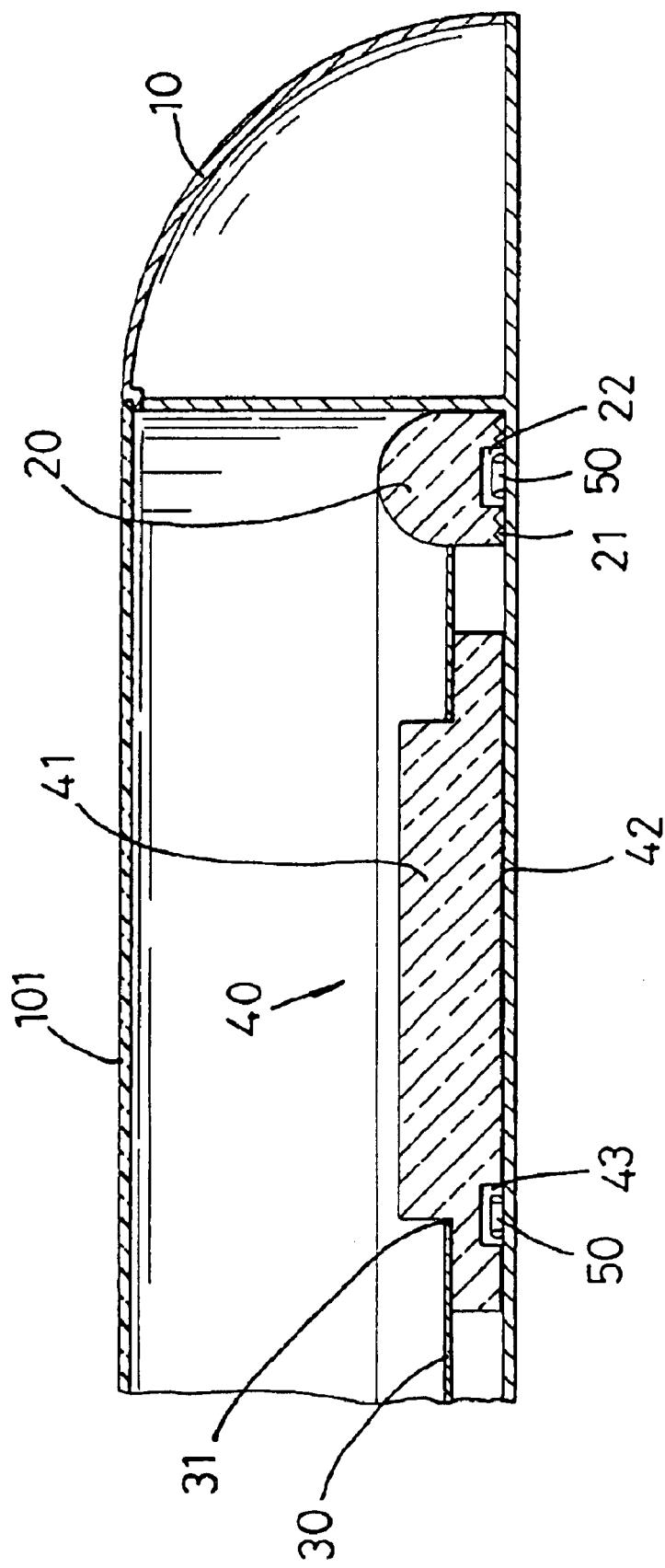
FIG. 3 is a cross-sectional view of one embodiment of the invention.

According to the present invention, the structure of the electroluminescent clock, as implemented in one embodiment shown in FIGS. 1 to 3, comprises an upper portion (10) of an external case, a main bracket (11) and a lower portion (12) of the external case, together with internal components including a transparent ring (20), a dial (30), a transparent plate (40), and multiple light emitting dots (50).

The upper portion (10) of the external case is the top cover exposed to the outside having a transparent window (101) at the center.

The main bracket (11) is used for assembling the upper portion (10) of the external case and the lower portion (12) of the external case, and for receiving other clock components.

The lower portion (12) of the external case is the base cover and also used for accommodating a mechanical unit and a power unit (13).

The transparent ring (20) is formed from light transmissive material, having the upper side shaped like a hump, and the lower side formed with grid-like grooves (21), wherein multiple first holes (22) are defined in the lower side of the transparent ring (20).

The dial (30) is formed from opaque material, having multiple slots (31) defined through the surface and corresponding to the positions of luminous markers (41), and a pointer (32) is installed at the center of the dial (30) and on the side facing the upper portion (10) of the external case.

The transparent plate (40) is formed from light transmissive material having luminous markers (41) attached on the upper side, wherein when the transparent plate (40) is joined with the dial (30), the luminous markers (41) are presented through the slots (31) of the dial (30), with the marker body either augmented from the surface of the dial (30) or embedded in the dial (30). The lower side of the transparent plate (40) touching the inner surface of the lower portion of the external case is coated with fluorescent material as a reflective layer (42). Multiple second holes (43) are defined at predetermined locations on the back side of the transparent plate (40), corresponding to the positions of the luminous markers (41) and being on the same side as the reflective layer (42).

The light emitting dots (50) are the source of light for the electroluminescent clock, which are actually light emitting diodes (LEDs).

The assembly of the electroluminescent clock, as shown in FIG. 2, starts from the lower portion (12) of the external case, the base; and then the main bracket (11) is aligned and placed over the lower portion (12) of the external case; and then the transparent plate (40), the dial (30), the transparent ring (20) and the upper portion (10) of the external case are assembled in that order, and secured by snappers (not shown).

The power unit (13) is installed in the space between the lower portion (12) of the external case and the main bracket (11).

The light emitting dots (50) are interposed between the transparent plate (40) and the main bracket (11), housed by the holes (43) (22) in the transparent plate (40) and the transparent ring (20).

In the present embodiment, as shown in FIG. 3, the luminous markers (41) are presented through the slots in the dial (30). The luminous markers (41) are in the form of figures, a scale or graphical patterns, and the markers (41) are augmented from the surface of the dial (30). The light emitting dots (50) are installed in the holes (22) (43). When the electricity supply is switched on, the light from the light emitting dots (50) brightens the luminous markers (41), coupling with the effect of the reflective layer (42), whereby light can be evenly distributed over the luminous markers (41) for producing good illumination effect. Furthermore, the dial (30) of opaque material can also enhance the effect of illumination by providing a clear silhouette to the luminous markers (41).

Figure 4:
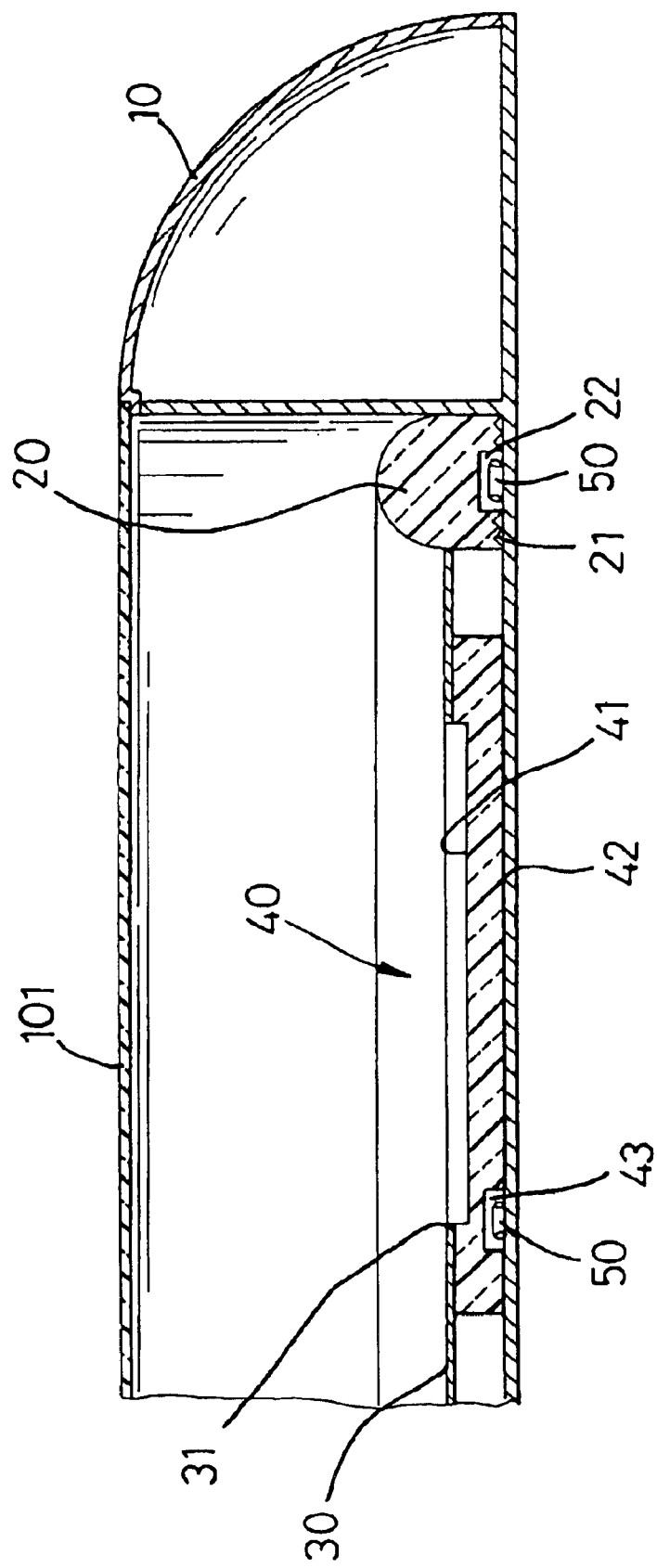
FIG. 4 is a cross-sectional view of another embodiment of the invention.

Another embodiment of the present invention is shown in FIG. 4, wherein the luminous markers (41) can be in the form of figures, a scale or graphical patterns as in the previous example, and the markers (41) are embedded in the dial (30), as opposed to the previously described example wherein the luminous markers (41) are augmented from the surface of the dial (30). Furthermore, the dial (30) and the transparent plate (40) are fabricated as a unit, and surrounded by the transparent ring (20). The light emitting dots (50) are housed by the first holes (22) as in the previous example.

When the light emitting dots (50) are enabled, the light from the light emitting dots (50) is cast uniformly over the luminous markers (41), whereby a user is able to see the clock time through the transparent window (101).

The electroluminescent clock, according to the present design, can be either connected by batteries or to a power outlet, depending on the users' requirements.

The illumination effect of the light emitting dots (50) can be further boosted by the reflective layer (42) and the opaque nature of the dial (30) to allow a user to see the clock time even from a distance.

With the addition of a transparent ring (20), the electroluminescent clock is designed for easy recognition of time in night light. That is, the light emitted from the light emitting dots (50) is modified by the grid-like grooves (21) and the hump shape of the transparent ring (20) to cause light diffusion, such that the diffused light around the clock outline creates a soft visual effect.

The foregoing description of the preferred embodiments of the present invention is intended to be illustrative only and, under no circumstances, should the scope of the present invention be so restricted.

What is claimed is:

1. An electroluminescent clock comprising a lower portion of an external case, a main bracket, multiple light emitting dots, a transparent plate, a transparent ring, a dial with a pointer located at the center, and an upper portion of the external case; wherein the transparent ring formed from light transmissive material is placed around a rim of the dial;

the transparent plate also formed from light transmissive material has luminous markers attached onto an upper surface of the transparent plate, and the transparent plate is placed over the main bracket; and the dial is formed from opaque material, having slots defined in a surface of the dial and the slots corresponding to the locations of luminous markers.

2. The electroluminescent clock as claimed in claim 1, wherein a lower side of the transparent plate has multiple first holes corresponding to the positions of the luminous markers for accommodating the light emitting dots.

3. The electroluminescent clock as claimed in claim 2, wherein the luminous markers are attached on to the upper side of the transparent plate, and when the dial is placed over the transparent plate the luminous markers are augmented from a surface of the dial.

4. The electroluminescent clock as claimed in claim 3, wherein the luminous markers are presented through the slots in the dial surface when the dial is placed over the transparent plate.

5. The electroluminescent clock as claimed in claim 3, wherein the luminous markers can be in the form of figures, a scale or graphical patterns.

6. The electroluminescent clock as claimed in claim 3, wherein the lower side of the transparent plate beneath the luminous markers is coated with a fluorescent material as a reflective layer.

7. The electroluminescent clock as claimed in claim 2, wherein the luminous markers are attached on to the upper side of the transparent plate, and when the dial is placed over the transparent plate the luminous markers are embedded in the dial.

8. The electroluminescent clock as claimed in claim 7, wherein the luminous markers are presented through the slots in the dial surface when the dial is placed over the transparent plate.

9. The electroluminescent clock as claimed in claim 7, wherein the luminous markers can be in the form of figures, a scale or graphical patterns.

10. The electroluminescent clock as claimed in claim 7, wherein the lower side of the transparent plate beneath the luminous markers is coated with a fluorescent material as a reflective layer.

11. The electroluminescent clock as claimed in claim 2, wherein the light emitting dots are light emitting diodes (LEDs).

12. The electroluminescent clock as claimed in claim 1, wherein a lower side of the transparent ring has multiple second holes for accommodating the light emitting dots.

13. The electroluminescent clock as claimed in claim 12, wherein the upper side of the transparent ring is shaped like a hump, and the lower side has grid-like grooves.

14. The electroluminescent clock as claimed in claim 12, wherein the light emitting dots are light emitting diodes (LEDs).

* * * * *